J. L. TOWNSEND.
FERTILIZER DISTRIBUTING APPARATUS.
APPLICATION FILED MAY 22, 1916.
1,213,711.
Patented Jan. 23, 1917.
2 SHEETS—SHEET 1.
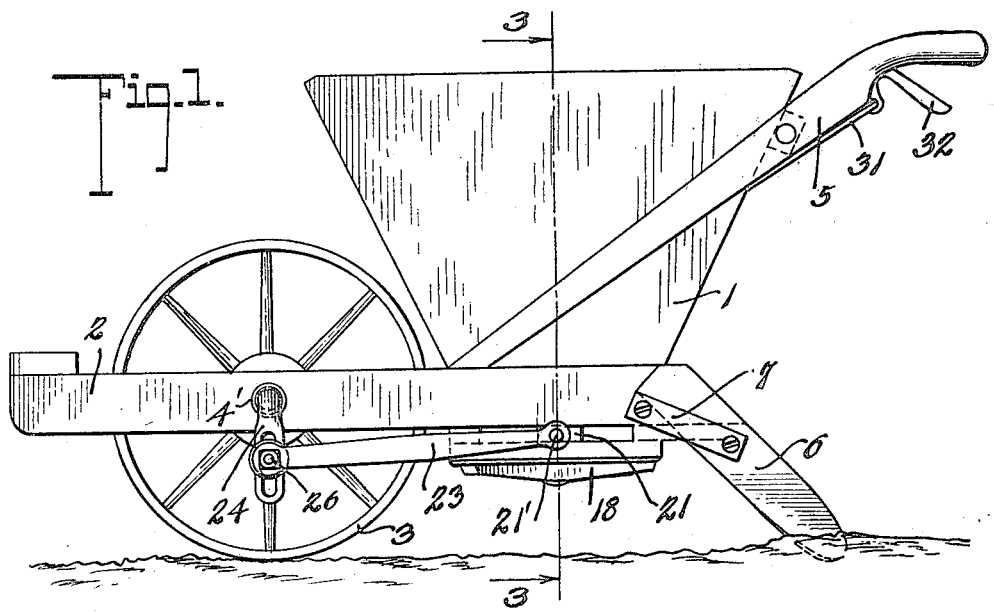
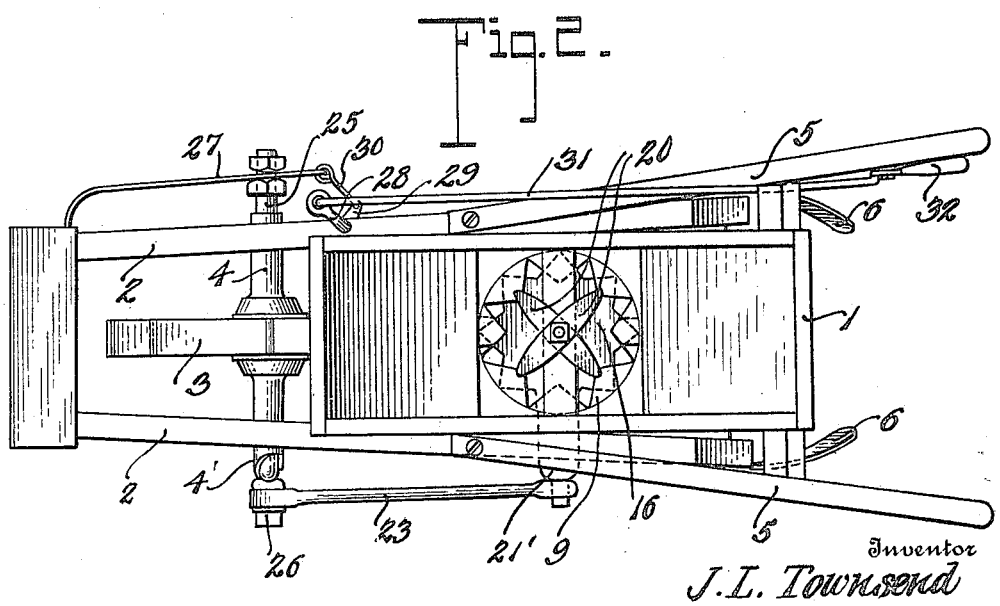

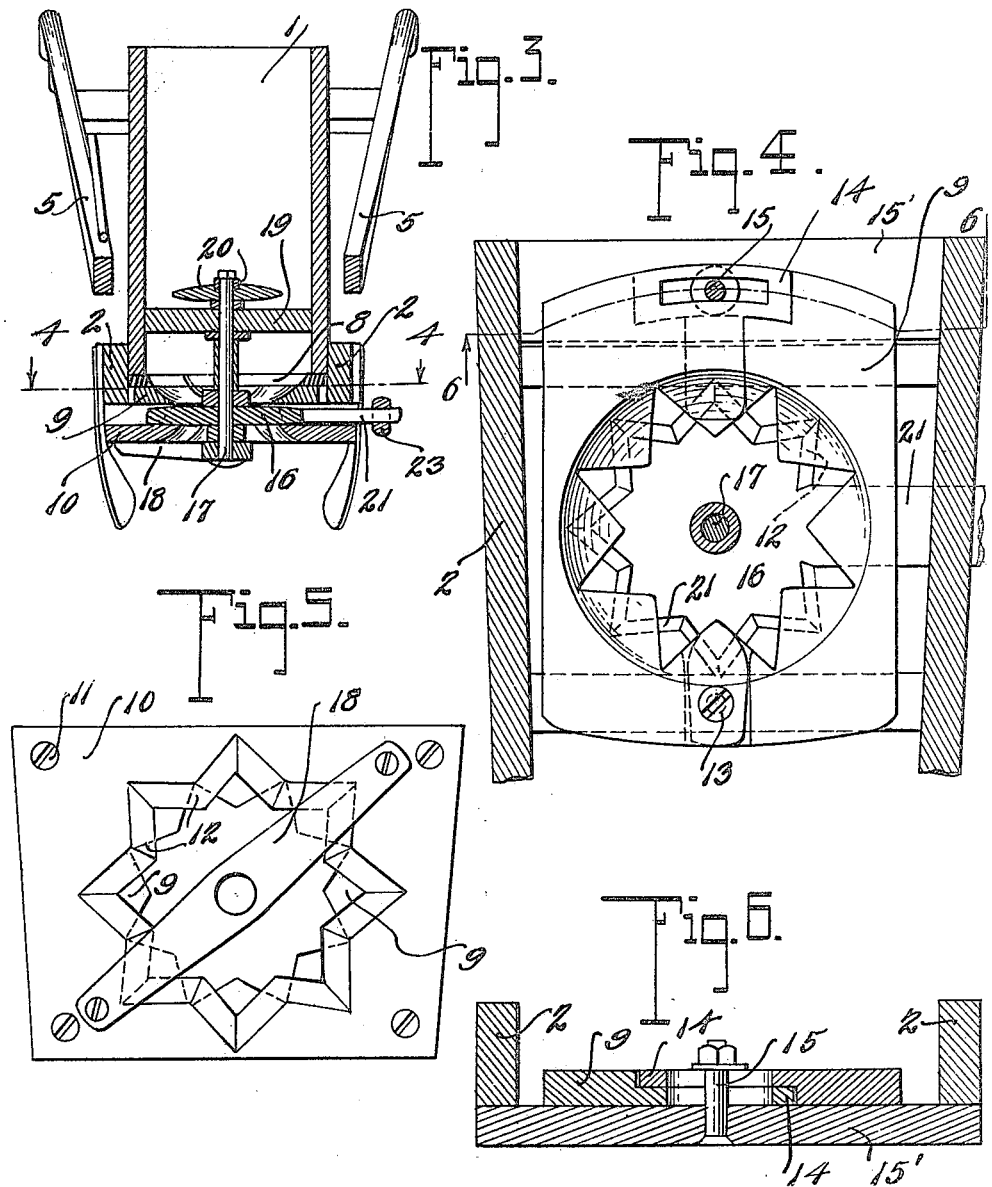

UNITED STATES PATENT OFFICE.

JAMES L. TOWNSEND, OF McDONALDS, NORTH CAROLINA.

FERTILIZER-DISTRIBUTING APPARATUS.

1,213,711.        Specification of Letters Patent.        Patented Jan. 23, 1917.

Application filed May 22, 1916. Serial No. 99,141.

*To all whom it may concern:*

Be it known that I, JAMES L. TOWNSEND, a citizen of the United States, residing at McDonalds, in the county of Robeson and State of North Carolina, have invented certain new and useful Improvements in Fertilizer-Distributing Apparatus, of which the following is a specification.

The present invention has to do with improvements in agricultural implements of that type designed primarily for the purpose of distributing fertilizer.

The machine embodies a suitable hopper for holding the fertilizer, the feed of which material therethrough is subject to the control of distributing means substantially closing the bottom of the hopper and it is in these means that the essence of the invention lies particularly.

In other words, it has for its object to provide relatively stationary and movable distributing elements so arranged with respect to each other as not to present any defined opening through the receptacle during operation of the machine but yet permitting the material to sift through the space between the elements under the action of agitating means, the operation of which causes the fertilizer to issue and be spread in a finely pulverized state.

A further object in view is to provide for an adequate control of the quantity of the fertilizer distributed as above specified.

These and such other objects as may hereinafter appear are attained by the novel construction, combination and arrangement of parts to be hereinafter specifically described and claimed.

Reference will now be had to the accompanying drawings, forming a part of the specification, wherein:

Figure 1 is a side elevation of an embodiment of the invention. Fig. 2 is a top plan view thereof. Fig. 3 is a vertical sectional view on the line 3—3 of Fig. 1. Fig. 4 is a horizontal sectional view on the line 4—4 of Fig. 3, the lowermost distributing plate being omitted for the sake of clearness. Fig. 5 is a bottom plan of the hopper, the intermediate distributing plate being omitted. Fig. 6 is a transverse sectional view taken about on the plane indicated by the line 6—6 of Fig. 4 showing the adjusting means for the sectional distributing plate.

Throughout the following detail description, and on the several figures of the drawings, similar parts are referred to by like reference characters.

Referring to the drawings and specifically describing this apparatus, the numeral 1 indicates a hopper of suitable size and conformation for containing the material which is to be distributed, namely, fertilizer as the commodity is commercially prepared, said hopper being supported upon a frame 2 provided with the ground wheel 3 which in turn is fixedly mounted upon the hollow shaft 4.

The apparatus above generally described is capable of being moved over the surface in any desired manner, and guided by means of the handle members 5 attached in any desired manner to the frame members 2. The rear extremity of said frame members is provided at each side with a curved blade 6 detachably held in position for engaging the surface of the earth by a brace 7. The blades 6, as will be clearly understood by those skilled in the art to which this invention refers, are designed to cover the fertilizer which is distributed by mechanism hereinafter specifically set forth in moving the machine over a furrow, for example, thereby preventing evaporation and unnecessary exposure of the fertilizing substance to the elements. The hopper 1 is open at its bottom, said opening being preferably circular as defined by the central apertured plate 8 secured at the base of the hopper on the frame and this opening will hereinafter be referred to as the discharge opening.

The distributing means forming the particular subject-matter of this invention consists of a plurality of plates, namely, an upper plate 9 and a lower plate 10 slightly spaced therefrom, the latter being secured in place by means of fastening members 11, as most clearly shown in Fig. 5 of the drawings. Both of the above described plates are cut away centrally so as to leave an opening therethrough practically equivalent in operative area to the discharge opening for the hopper or container 1 but the edges of the openings in these plates are formed with spaced projections which for the purpose of this description will be termed pulverizing blades, designated 12.

It will be observed by reference to Fig. 5 of the drawings that the plates 9 and 10 are so arranged with respect to each other that the annular blades 12 of one lie over the spaces between the blades of the other plate under normal conditions. Furthermore the edges of the blades of each of these plates are beveled so as to provide for a suitable cutting action which is particularly desirable in operating with commercial fertilizers. The uppermost plate 9, as will be observed in Figs. 4 and 5, is sectional in formation, the sections being pivoted together at 13 at one side thereof, the other side of the plate having overlapping portions 14 which are slotted transversely of the plate to receive an adjusting bolt 15 carried by a transverse bar 15' at the rear of the frame. The sections of this plate are, therefore, capable of being adjusted so as to more or less control the operative area of its central opening.

Intermediate the plates 9 and 10 is disposed a third plate 16 which is fixedly mounted upon a vertical spindle 17 having a bearing at its lower end in a bridge member or bar 18 attached to the lower surface of the plate 10, and a bearing in the transverse bar 19 attached to the inside of the sides of the hopper 1. The upper extremity of the spindle is preferably provided with cross arms 20 which are movable with the spindle as will hereinafter be set forth and the function of these arms is to break up the lumps ordinarily found in commercial fertilizers preventing the discharge opening of the hopper from becoming clogged and insuring that the material will go to the distributing plates in a fairly comminuted state. It will be observed that the central plate 16 is of such size as to practically close the opening through the plates 9 and 10 so that as a matter of fact there is no defined opening through the distributing plates from the hopper 1 excepting as may be incidental to the slight spacing of the plates themselves. The periphery of the central plate 16 is provided with pulverizing blades 21 which are practically the same in conformation as the blades of the coöperating relatively stationary plates. It is to be noted at this point that the distributing plates hereinbefore referred to may be of any desired thickness but they are preferably thin, though in the drawings the thickness is proportionately exaggerated for the purpose of clearness.

The central plate 16 is formed with a lateral arm 21' which projects from one side of the frame 2 and a connecting rod 23 is pivotally secured to its outermost extremity. The opposite end of this rod is adjustably secured to the crank arm 24 which is formed by bending the end of the shaft 25 at a right angle, said shaft being shiftably mounted in the hollow shaft 4 to which the ground wheel 3 is secured. The crank arm 24, as will be noted in Fig. 1 is slotted to provide for adjustment of the connection 26 for the connecting rod 23 so that said rod may be easily adjusted to increase or decrease the agitation or oscillation of the plate 16 incident to movement of the apparatus over the surface in the operation of the distributer. One extremity of the hollow shaft 4 is provided with clutch elements 4' with which the crank arm 24 of the shaft 25 interlocks to cause rotation of the shaft 25 throughout the revolution of the wheel 3. The clutch connection just described is maintained by a spring 27 secured at one end to the forward extremity of the frame 2 and connected intermediate its length to the shaft 25, said spring normally tending to hold the arm 24 in engagement with the elements 4'. In order to disconnect the clutch means at will so as to enable movement of the vehicle without actuation of the distributing means, I provide a vertically arranged rock shaft 28 on the frame 2 at one side of the hopper, the lower extremity of said shaft having a lateral arm 29 connected by a link 30 to the end of the spring 27. The upper arm of the shaft 28 has connected thereto a rod 31 provided at its rear extremity with a manipulating grip piece or lever 32 arranged at a convenient position with respect to a handle 5 for manipulation by the operator of the machine. Upon actuation of the lever 32 the rock shaft 28 will cause the spring 27 to move laterally carrying the shaft 25 therewith and disconnecting the crank arm 24 from the clutch elements 4', in which condition the vehicle may be moved without operating the distributing means.

One of the important features to be noted from the description of the apparatus above given is the absence of bridgework at the bottom of the hopper which leaves practically the entire bottom exposed to the material to be operated upon while leaving no direct opening through the plates. The material which is agitated by the intermediate plate is caused to be distributed evenly in an area equal to the diameter of the bottom of the receptacle, the material moving from the receptacle over the edges of the plates and being acted upon by the beveled blades with which the plates are formed. The adjustability of the connecting rod together with the adjustability of the upper distributing plate regulates the quantity of material which passes through the machine and the material or fertilizer is adequately prevented from adhering to the plates and thereby lessening its distribution by the coöperation of these parts in the manner above described.

Having thus described my invention, what I claim as new is:

1. In fertilizer distributing apparatus of the class described, the combination with a hopper having a discharge opening substantially equal to the area of the bottom of the hopper, of distributing plates entirely closing the discharge opening of said hopper, and agitating means operably connected to one of the plates for causing the fertilizer to sift from between the plates during movement of the apparatus.

2. In fertilizer distributing apparatus of the class described, the combination of a hopper having a discharge opening, a relatively stationary apertured plate attached to the hopper at said opening, and an agitating plate substantially closing the discharge opening, said plates having coöperating projections adapted to operate upon the material to pulverize and work the same from between the plates.

3. In fertilizer distributing apparatus of the class described, the combination of a hopper having a discharge opening, relatively stationary spaced plates each having their central portion cut away to form spaced projections and arranged at the discharge opening, a movable member disposed intermediate said spaced plates forming a closure for the plates and the discharge opening of the hopper, and means for agitating said movable member to work the material from between the plates and over their edges.

4. In fertilizer distributing apparatus of the class described, the combination of a hopper having a discharge opening, relatively stationary spaced plates each having their central portion cut away so as to leave spaced projections, the projections of one plate being arranged over the spaces between the projections of the other plate, and an intermediate movable plate for agitating the material to distribute the same from the hopper.

5. In fertilizer distributing apparatus of the class described, the combination of a hopper having a discharge opening, and relatively superposed plates each having their body cut out to form annular pulverizing blades, one of said plates constituting a substantial closure for the discharge opening of the hopper.

6. In fertilizer distributing apparatus of the class described, the combination of a hopper having a discharge opening, and relatively superposed plates each having their body cut out to form annular pulverizing blades, one of said plates constituting a substantial closure for the discharge opening of the hopper, the edges of the blades being beveled to provide cutting edges for comminuting the fertilizer material.

7. In fertilizer distributing apparatus of the class described, the combination of a hopper having a discharge opening, relatively stationary plates arranged in spaced relation at the opening aforesaid, each of said plates having its central portion open, spaced blades projecting from the edges of the plate openings, an intermediate oscillatory plate arranged at the openings of the plates aforesaid, corresponding blades formed on the periphery of the oscillatory plate, and means for agitating the last mentioned plate.

8. In fertilizer distributing apparatus of the class described, the combination of a hopper having a discharge opening, a relatively stationary sectional plate arranged at the opening of said hopper, a second plate arranged to substantially close the opening of the stationary plate, and means for adjusting the sections of the stationary plate to regulate the flow of material from the hopper.

9. In fertilizer distributing apparatus of the class described, the combination of a hopper having a discharge opening, a relatively stationary sectional plate arranged at the opening of said hopper, the sections of said plate being pivoted at one side, adjusting means connecting the sections at the other side of said plate, a second plate coöperating with the last mentioned plate, and means for agitating the last mentioned plate.

10. In fertilizer distributing apparatus of the class described, the combination of a hopper having a discharge opening, a relatively stationary sectional plate arranged at the opening of said hopper, the sections of said plate being pivoted at one side, adjusting means connecting the sections at the other side of said plate, a second oscillatory plate coöperating with the last mentioned plate, means for oscillating the oscillatory plate, and means for regulating the extent of oscillation of the said plate to thereby regulate the quantity of material distributed.

In testimony whereof I affix my signature.

JAMES L. TOWNSEND.

Copies of this patent may be obtained for five cents each, by addressing the "Commissioner of Patents, Washington, D. C."